United States Patent
Shao et al.

(10) Patent No.: US 9,866,069 B2
(45) Date of Patent: Jan. 9, 2018

(54) MANUALLY BEAM STEERED PHASED ARRAY

(71) Applicants: Shuai Shao, Menlo Park, CA (US); Ken Gudan, Menlo Park, CA (US); Jonathan J. Hull, Menlo Park, CA (US)

(72) Inventors: Shuai Shao, Menlo Park, CA (US); Ken Gudan, Menlo Park, CA (US); Jonathan J. Hull, Menlo Park, CA (US)

(73) Assignee: RICOH CO., LTD., Tokyo (JP)

( * ) Notice: Subject to any disclaimer, the term of this patent is extended or adjusted under 35 U.S.C. 154(b) by 361 days.

(21) Appl. No.: 14/584,821

(22) Filed: Dec. 29, 2014

(65) Prior Publication Data

US 2016/0190687 A1 Jun. 30, 2016

(51) Int. Cl.
*H03K 17/80* (2006.01)
*H02J 17/00* (2006.01)
*H01Q 1/24* (2006.01)
*H01Q 3/36* (2006.01)
*H01Q 21/06* (2006.01)

(52) U.S. Cl.
CPC .......... *H02J 17/00* (2013.01); *H01Q 1/248* (2013.01); *H01Q 3/36* (2013.01); *H01Q 21/065* (2013.01)

(58) Field of Classification Search
USPC .................................................. 307/149, 154
See application file for complete search history.

(56) References Cited

U.S. PATENT DOCUMENTS

| | | | | |
|---|---|---|---|---|
| 4,072,951 A * | 2/1978 | Kaloi | ............... | H01Q 9/0407 343/700 MS |
| 7,532,162 B2 * | 5/2009 | Braam | ............... | H01Q 3/01 343/700 MS |
| 8,164,538 B2 * | 4/2012 | Montgomery | ......... | H01Q 1/243 343/820 |
| 8,344,956 B2 * | 1/2013 | Montgomery | ....... | H04B 5/0081 342/159 |
| 9,401,547 B2 * | 7/2016 | Montgomery | ......... | H01Q 21/28 |
| 2005/0243005 A1 * | 11/2005 | Rafi | ..................... | H01Q 9/0442 343/767 |
| 2008/0238774 A1 * | 10/2008 | Ratni | ................... | H01Q 3/2617 342/372 |
| 2009/0273537 A1 * | 11/2009 | Tang | .................... | H01Q 1/2283 343/895 |
| 2009/0309804 A1 * | 12/2009 | Chen | ................. | H01Q 21/0075 343/893 |
| 2010/0238087 A1 * | 9/2010 | Jung | ........................ | H01Q 3/30 343/810 |
| 2013/0234536 A1 * | 9/2013 | Chemishkian | .......... | H02J 17/00 307/149 |
| 2016/0190687 A1 * | 6/2016 | Shao | ........................ | H02J 17/00 307/149 |

(Continued)

*Primary Examiner* — Adam Houston
(74) *Attorney, Agent, or Firm* — Blakely, Sokoloff, Taylor & Zafman LLP

(57) ABSTRACT

A beam steered phased array antenna and system for including the same are described. In one embodiment, the antenna apparatus comprises an array of a plurality of antenna elements, the array having a single moveable feeding point coupled to the antenna elements, where the moveable feeding point is movable with respect to the antenna elements in the array.

19 Claims, 15 Drawing Sheets

(56) References Cited

U.S. PATENT DOCUMENTS

2016/0190869 A1\* 6/2016 Shao ................ H02J 17/00
                                                    307/149
2017/0033471 A1\* 2/2017 Huang ............... H01Q 21/26
2017/0047987 A1\* 2/2017 Pellegrino .......... H01L 31/042
2017/0141472 A1\* 5/2017 Park ................. H01Q 9/0414
2017/0222318 A1\* 8/2017 Li .................... H01Q 1/526
                                                    343/725

\* cited by examiner

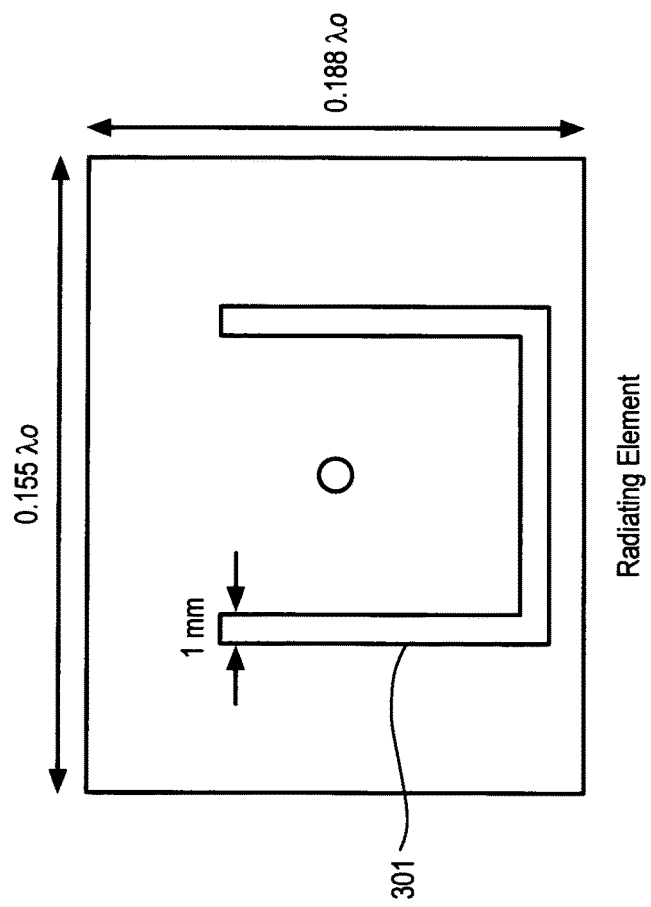
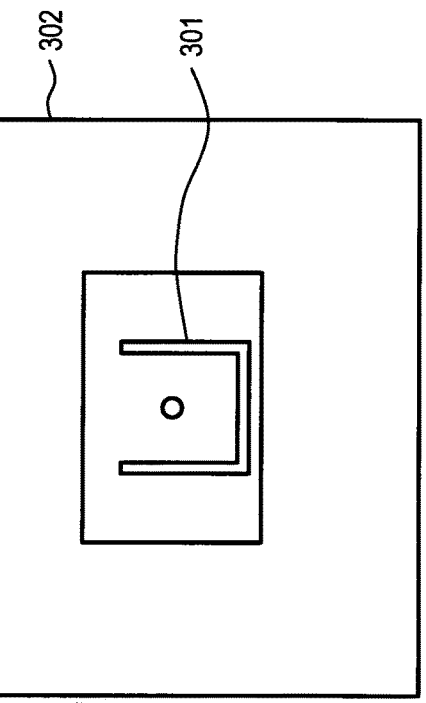
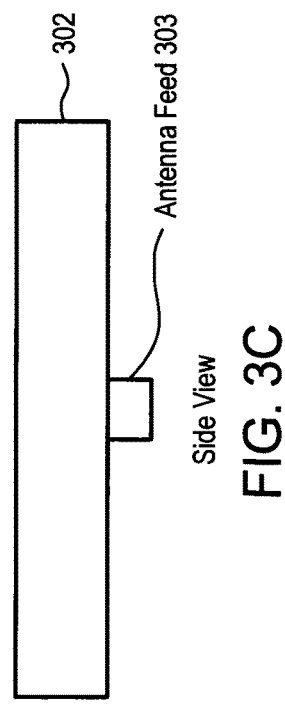
FIG. 3A Radiating Element
FIG. 3B Top View
FIG. 3C Side View

MANUALLY BEAM STEERED PHASED ARRAY

RELATED APPLICATIONS

This application is related to the co-pending application entitled "Reconfigurable Reconstructive Antenna Array", concurrently filed on Dec. 29, 2014, U.S. patent application Ser. No. 14/584,806, and co-pending application entitled "Individual Antenna Element", concurrently filed on Dec. 29, 2014, U.S. patent application Ser. No. 14/584,817, both assigned to the corporate assignee of the present invention.

FIELD OF THE INVENTION

Embodiments of the present invention relate to the field of radio-frequency (RF) communication; more particularly, embodiments of the present invention relate to devices that perform RF energy harvesting.

BACKGROUND OF THE INVENTION

Radio-Frequency (RF) power harvesting techniques have been applied widely for providing long term power supply of low energy consumption and battery-less devices. It is an essential component of passive RFID systems. Recently, there has also been a strong interest in implementing wireless power harvesting techniques with sensor technology for monitoring various environmental conditions such as temperature, pressure, humidity and human health conditions.

Antennas are one of the most critical elements of a RF power harvesting system. The antenna collects ambient radio frequency energy from various sources and delivers the power into the rectifier, which converts the RF power into DC voltage.

An antenna with beam scanning capability is desirable for power harvesting system. By steering the main beam, maximum power could be collected regardless of the position of the power harvesting unit. For some cases, a single antenna is not sufficient for providing reliable power. Therefore, a variety of antenna arrays with different topologies and arrangements have been proposed to increase the overall gain and enhance the efficiency of power harvesting system. Typical antenna arrays mostly improve the efficiency by increasing antenna diversity (multiple bands, multiple rectifiers, DC combiners) or achieve maximum gain at a specific direction (single rectifier, RF combiner), but do not address the issue of beam steering.

When necessary, conventional array antennas use phase shifters to achieve beam steering functionality. However, phase shifters are a poor choice for RF energy harvesting systems, because they increase the cost and complexity of the harvesting system. Phase shifters are not only lossy but also require a significant amount of power to be operable, which would make harvesting power in desirable quantities difficult.

SUMMARY OF THE INVENTION

A beam steered phased array antenna and system for including the same are described. In one embodiment, the antenna apparatus comprises an array of a plurality of antenna elements, the array having a single moveable feeding point coupled to the antenna elements, where the moveable feeding point is movable with respect to the antenna elements in the array.

In another embodiment, a sensor mode comprises: one or more sensors for sensing and logging data; a transmitter to transmit information wirelessly; an antenna apparatus comprising an array of antenna elements, and a moveable feeding point coupled to the antenna elements to move the feeding point with respect to the antenna elements in the array, where the feeding point combines radio frequency energy together for RF; an energy harvesting unit coupled to the antenna apparatus and operable to convert incident energy received by the antenna apparatus to direct current (DC); and a microcontroller coupled to the energy harvesting unit, the one or more sensors and the transmitter, where the microcontroller is operable to cause the transmitter to communicate sensed data from at least one of the one or more sensors while powered by energy previously harvested by the energy harvesting and storage unit.

In yet another embodiment, a communication system comprises: an access point coupled to provide access to a network; a sensor node comprising one or more sensors for sensing and logging data; a transmitter to transmit information wirelessly, an antenna apparatus comprising an array of antenna elements, and a moveable feeding point coupled to the antenna elements to move the feeding point with respect to the antenna elements in the array, where the feeding point combines radio frequency energy together for RF; an energy harvesting unit coupled to the antenna and operable to convert incident energy received by the antenna apparatus to direct current (DC); and a microcontroller coupled to the energy harvesting unit, the one or more sensors and the transmitter, where the microcontroller is operable to cause the transmitter to communicate sensed data from at least one of the one or more sensors to the access point while powered by energy previously harvested by the energy harvesting and storage unit.

Embodiments of the invention can take other forms, such as, for example, methods, computer readable storage media, etc.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 3A-C illustrates one embodiment of a planar patch antenna with a U-slot.

DETAILED DESCRIPTION OF THE PRESENT INVENTION

Figure 1:
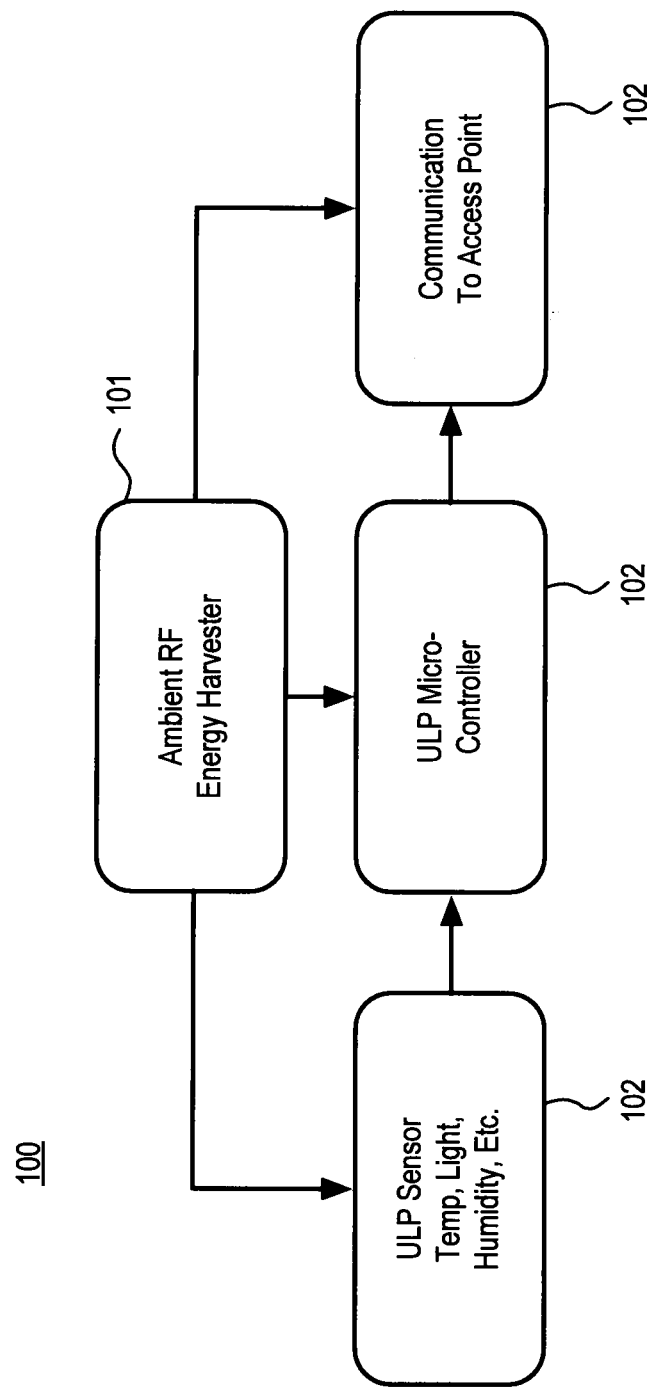
FIG. 1 is a block diagram of one embodiment of a sensor device.

A manually beam steered phase array antenna is disclosed. In one embodiment, the array antenna has a miniaturized radiating element for radio-frequency (RF) power harvesting applications (e.g., 2.4 GHz RF power harvesting applications) and achieves high gain at a wide scanning angle. In one embodiment, the miniaturized radiating element is a broadband antenna element that reduces the size of the antenna array and provides wide steering angle impedance matching of the antenna array. In one embodiment, the antenna array comprises a 2×2 array of radiating elements. The antenna increases harvested power under different circumstances when integrated with a power harvesting device.

Antenna embodiments described herein are lower cost, have less complexity, are not lossy, and require less power to operate while being small in size.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

A manually beam-steered phase array antenna for RF power harvesting applications is described. In one embodiment, the antenna array comprises three components: the antenna elements, a feeding network, and the movable feeding structure. In one embodiment, these components work together to steer the main beam without physically rotating the position of the antenna so that the main beam of the receiving antenna faces, or is more closely aligned with, the main beam of maximum transmitting power, providing high gain (e.g., >2 dBi) and still being low profile and compact. In one embodiment, the antenna is used for 2.4 GHz RF power harvesting applications. In one embodiment, the antenna array achieves a peak realized gain of 11.3 dBi, with the main beam of the array being steerable from −35 to 35 degrees continuously within the electric field plane. In one embodiment, the beam steering functionality is achieved by manually shifting the position of the feeding point using the moveable feeding structure, which does not require any external electrical power, but can be manually configured (positioned) at antenna installation, or as conditions change.

In the following description, the antenna array is described. First, however, embodiments of a communication system and sensor devices are described.

A Wi-Fi Communcation System with a Sensor Node

One embodiment of a Wi-Fi wireless communication system is described. In the Wi-Fi communication system, communications occur at 2.4 GHz or 5.8 GHz. However, techniques disclosed herein are not limited to these frequencies and the techniques may be used in communication systems that operate at other frequency bands. Note that in alternative embodiments, other wireless communication systems (for example, RFID) function at other radio frequencies, and the specific frequency band is not a limiting factor of this design approach.

In one embodiment, the Wi-Fi communication system is used as part of an intelligent sensor network having one or more sensor nodes (e.g., tags). In one embodiment, the sensor nodes harvest and store energy (e.g., photovoltaic, thermal, vibrational, etc.), collect and process sensor data, and communicate with other devices (e.g., Wi-Fi devices) using a communication standard (e.g., Wi-Fi, Zigbee, Bluetooth, Bluetooth Low Energy), or even proprietary interfaces.

Note that although the sensor nodes are described herein as being low-power sensor nodes that harvest and store energy, the techniques described herein are not limited to the use of such sensor nodes and are applicable to various sensor node configurations, including, but not limited to those that contain wireless communication chips (e.g., Wi-Fi chips).

FIG. 1 is a block diagram of one embodiment of a sensor device. The sensor device may be part of a tag. Referring to FIG. 1, sensor device 100 comprises an ambient radio-frequency (RF) energy harvester 101, an ultra-low-power (ULP) sensor 102 (e.g., temperature, light, humidity, pressure, human health conditions, etc.), a micro-controller 103, and a communication unit 104. Although not shown, sensor device 100 includes one or more antenna arrays as described herein. The antenna array(s) may be part of communication unit 104 or may be separate from communication unit 104, such as in the case of an antenna array used to harvest energy separate from the communications antenna.

In one embodiment, RF energy harvester 101 harvests ambient RF power to run ultra-low power sensors 102, micro-controller 103, and/or communication unit 104, based on received RF input energy incident to antenna (not shown) sensor device 100. There are a number of sources of ambient RF power, including, but not limited to WiFi, DTV and GSM signals. Other sources of ambient RF power include, for example, toys, proprietary communication protocols, and even stray energy leakage from devices, such as microwave ovens. The antenna receiving the RF energy input may be part of communication unit 104 or a separate antenna. The antenna(s) may be designed to receive the energy in multiple frequency bands, or there may be separate antenna(s) for these different frequency bands.

In one embodiment, sensor 102 comprises an ultra-low-power (ULP) sensor and/or tag and micro-controller 103 comprises an ultra-low-power (ULP) micro-controller. Sensor 102 may comprise a temperature sensor, a light sensor, a motion sensor, air flow sensor, image sensor, accelerometer, gyroscope, gas detector, microphone, atmospheric pressure sensor, humidity sensor, mechanical pressure sensor, etc. In one embodiment, sensor 102, as a ULP sensor, has a power requirement of 1-20 uW and a duty cycle of 1% to 10% (where the duty cycle varies in response to available energy over a period of time or the specific sensing needs, usually seconds to hours).

In one embodiment, micro-controller 103 performs control operations and/or processing for the sensor device 102. In one embodiment, controller 103 is responsive to and receives sensor data from sensor 102 and provides it to communication unit 104 for transmission (e.g., wireless transmission) from device 100. Controller 103 may also log sensor data for a time, and transmit the entire log to communication unit 104 for transmission later. Note that in this case, the sensing rate and the communication rate can be different.

Communication unit 104 provides a communication mechanism for sensor device 100. In one embodiment communication unit 104 is a wireless communication unit. In one embodiment, communication unit 104 has an RF transmitter along with an antenna, (e.g., antenna array described herein, an antenna with a single element, etc.) for receiving and transmitting RF communication signals, including RF signals transmitted to an access point or other locally positioned device.

In one embodiment, the ambient RF energy harvester 101 is optimized for overall efficiency and a minimum of start-up power. These optimizations improve the range at which energy can be usefully harvested and improve the number of places where ambient RF energy harvesting is practical, particularly in view of the fact that ambient RF energy levels are small and often bursty (traffic-dependent), rectified DC voltages are very low (<100 mV) at typical ranges, and typical Complementary Metal Oxide Semiconductor (CMOS) loads such as MCU etc. require 800+mV to operate.

Figure 2:
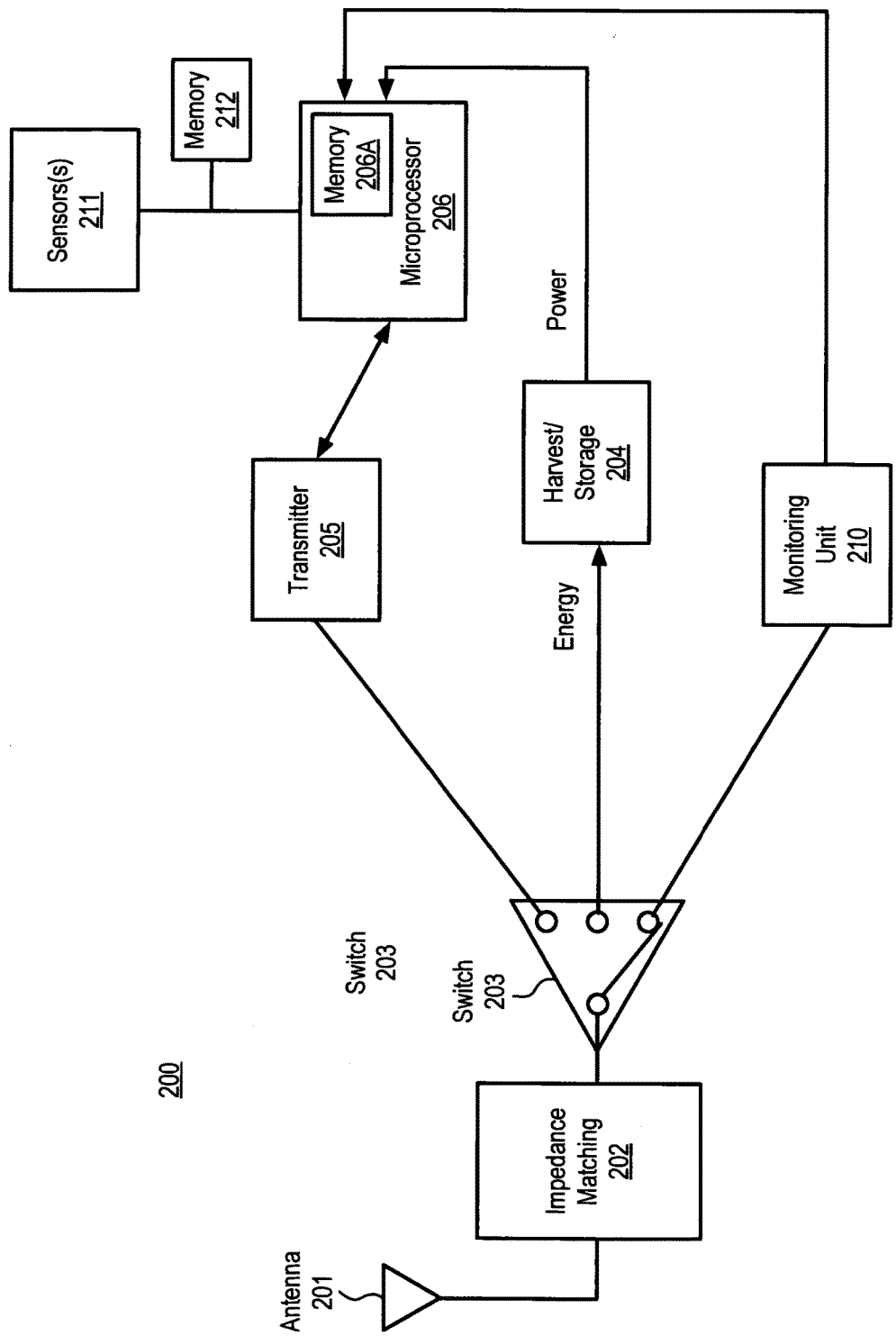
FIG. 2 is a more detailed block diagram of one embodiment of a sensor device.

In one embodiment, the intelligent sensor network includes Wi-Fi sensor nodes (e.g., tags). FIG. 2 is a more detailed block diagram of an embodiment of a sensor node 200 (e.g., sensor tag) that communicates over Wi-Fi. Referring to FIG. 2, antenna 201 is coupled to impedance matching circuit 202, and switch 203. The impedance matching circuit 202 may comprise a passive network of components that improves energy transfer from a source impedance to a load impedance. In one embodiment, impedance matching circuit 202 is an LC circuit (i.e., a circuit with an inductor and a capacitor). Switch 203 has a terminal coupled to RF transmitter 205. RF transmitter 205 transmits or broadcasts information such as, for example, data from sensor readings wirelessly using antenna 201. In one embodiment, RF transmitter 205 is an 802.11 Wi-Fi transmitter. RF transmitter 205 is coupled to microprocessor 206 and is responsive to one or more control signals from microprocessor 206 to transmit information. In another embodiment, RF transmitter 205 is a Bluetooth transmitter (including a Bluetooth Low Energy transmitter capable of sending packets (e.g., advertising packets)).

Another terminal of switch 203 is also coupled to energy harvesting and storage circuitry 204. Energy harvesting and storage circuitry 204 is used to provide power to transmitter 205, microprocessor 206 and memory 212, monitoring unit 210, and sensors 211. In one embodiment, energy harvesting and storage circuitry 204 includes an energy harvesting unit and a storage unit. Energy harvesting and storage circuitry 204 receives energy via antenna 201 through switch 203 and impedance matching circuit 202, and the energy harvested is stored in an energy storage device. The harvesting circuitry may include a diode based rectifier for converting incoming RF energy to a DC voltage. In some embodiments, the diode based rectifier may include Schottkey diodes such as those manufactured by Avago Technologies Inc. The harvesting circuits may also include energy management functions based on discrete implementations known to those familiar with the state of the art, or they could use energy harvester parts such as the MAX17710 of Maxim Integrated™ or the LTC3108 of Linear Technology. The storage unit can be a capacitor, super-capacitor, or any type of rechargeable battery technology such as, for example, an Eneloop battery. In addition to RF, source energy for the charger could also be photovoltaic, thermal, or vibrational. Battery chargers for this type of energy harvesting are well-known to those familiar with the art. The sensor node may comprise a tag that includes tag material. The tag substrate material can be a standard printed circuit board, low-dielectric loss printed circuit board, or a flexible tag printed on film such as modern standard RFID tags.

Sensors 211 include one or more sensors that sense data and provide sensed data to microprocessor 206. In one embodiment, sensors 211 comprise, for example, one or more temperature, pressure, humidity, gas composition, image, and position sensors. In one embodiment, sensor node 200 spends most of its time asleep and wakes up to enable sensors 211 to sense data and to transmit that data to locations remote to sensor node 200. There are a number of well-known techniques (e.g., interrupt-based techniques) that can be used to wake up sensor node 200 at different times (e.g., pre-determined intervals) to take sensor readings.

In one embodiment, in response to one of sensors 211 sensing data, the sensor signals (e.g., generates an interrupt) to microprocessor 206 to wake-up microprocessor 206 so that the sensed data can be stored on the node (in RAM or ROM internal to microprocessor 206 such as memory 206a or external to microprocessor 206 such as memory 212. Memory 206 could also be dual-ported in which case the sensor (211) could write into memory while microprocessor 206 is asleep), so that it can be uploaded to the network (via wireless communication with another RF device that is proximate to it) at a later time. In one embodiment, sensors 211 interrupt microprocessor 206 only when their sense outputs change significantly enough to desire microprocessor 206 to wake up and capture the new condition prior to going back to sleep. Finally, a sensed situation might be significant enough (such as an alarm alert) that one of sensors 211 wakes microprocessor 206 up for a communications event, in addition to a storage event.

Microprocessor 206 acts as a controller for sensor node 200. In one embodiment, microprocessor 206 generates messages to be transmitted wirelessly, via transmitter 205 and antenna 201. In one embodiment, microprocessor 206 creates at least some messages by embedding data from one or more sensor readings from sensors 211 in a field of the message, where the field is designated as part of a standardized protocol (e.g., Wi-Fi) to send information other than the data sensor readings. In one embodiment, the message is a Wi-Fi probe request message and the data sensor readings from sensors are embedded in a field used to specify vendor information. In one embodiment, the field is the Vendor Specific Information as set forth in 802.11. Alternatively, Bluetooth Low Energy advertising packets could be used in a similar way.

Note that these wireless interfaces do not necessarily need to be receivers. Receiver nodes are useful, but not required, for configuration. However, if sensor node 200 is self-configured, or one-time configured, there is no need for a communications receiver, and therefore the overall power consumption of sensor node 200 is lower.

Microprocessor 206 sends the messages to transmitter 205 for transmission to another wireless component (e.g., an access point, a base station, etc.). In one embodiment, microprocessor 206 sends the messages to transmitter 205 for transmission when notified that the wireless communication channel is at or above a predetermined quality level.

Another terminal of switch 203 is also coupled to monitoring unit 210. Monitoring unit 210 determines whether a wireless communication channel that is going to be used to transmit data from sensor readings made by sensors 211 is at or above the predetermined quality level. In one embodiment, monitoring unit 210 performs this by monitoring incoming radio frequency (RF) signals without the use of a wireless communication receiver. In other words, the determination is made without using a wireless communication receiver. In one embodiment, the determination is made by monitoring incoming radio frequency (RF) signals using an envelope detector (e.g. a log amp). In another embodiment, the determination is made by converting incoming radio frequency (RF) signals to a voltage and comparing the voltage to a threshold voltage level. The voltage conversion may be performed by an RF power detector or a RF rectifier.

When monitoring unit 210 determines the wireless communication channel is at or above the predetermined quality level (e.g., there is no current wireless communication in progress), monitoring unit 210 notifies microprocessor 206, via a signal or other indication, which causes microprocessor 206 to signal and/or otherwise control transmitter 205 to broadcast the message containing the sensor readings. This is one embodiment of a way for a transmit-only ultra-low-power tag to transmit packets without collisions.

Antenna Element Embodiments

A small-sized and wide bandwidth antenna is described that may be used for a variety of wireless power harvesting applications, such as, for example, those described above. In one embodiment, the antenna is physically very small, yet provides broader radiation coverage than prior art antennas. Note that the broad bandwidth makes the antenna less susceptible to not only manufacturing imperfection and variation but also environmental changes.

In one embodiment, the antenna element provides broad bandwidth while being electrically small, where the antenna has a dimension smaller than half of a wavelength. In one embodiment, the antenna element is electrically small and meets the requirement:

$$2\pi r/\lambda \ll 1,$$

where $\lambda$ is the wavelength of the RF frequency of interest (for example, for 2.4 GHz, $\lambda$=120 mm), and r is the radius of the radiating element.

In one embodiment, the antenna element's overall dimensions are less than ¼-the wavelength of interest, and may be part of a high gain (>2 dBi) patch antenna that has increased bandwidth, increased gain, and reduced physical size for a given frequency when compared with prior art antennas. In one embodiment, the patch antenna has a 3 dBi gain with +/−50 degree coverage. In another embodiment, the coverage is +/−45 degrees with at least a 3 dBi gain.

FIGS. 3A-C illustrate one embodiment of a planar patch antenna with a U-slot. In one embodiment, the planar patch antenna is a probe-fed planar microstrip patch antenna with a U-slot that is designed for a 2.4 GHz power harvesting system.

Referring to FIG. 3A, radiating element 300 comprises U-shaped element 301. As shown in FIG. 3B, radiating element 300 is on antenna substrate 302. In order to reduce the size of the antenna effectively, antenna substrate 302 is a dielectric material of high permittivity and low loss (e.g., Rogers RO3010™ substrate material with a thickness of 6 mm and a dielectric constant of $\in r$=10.2 tan $\delta$=0.0022). In one embodiment, the radiating element 300 of FIG. 3A occupies a space within 0.16λ×0.16λ. In another embodiment, the radiating element 300 of FIG. 3A occupies a space of 0.155λ×0.118λ (19 mm×14.5 mm). In one embodiment, the size of the ground plane is 40 mm×40 mm.

In one embodiment, the width of the slot is 1 mm, the length of the base of the slot is 10.15 mm, the length of the sides of the slot are 9.7 mm, and the distance between the base of the slot and the bottom of the antenna element 300 is 1 mm, which helps lower manufacturing difficulty and reduce costs. In another embodiment, the width of the slot is greater than 0.5 mm.

In one embodiment, the antenna substrate 302 has a length and width of 0.327λ and a height of 0.05λ, as shown in FIGS. 3B and 3C. FIG. 3C also shows antenna feed 303 that feeds radiating element 300 with a signal from the bottom/or underneath antenna substrate 302.

In one embodiment, the antenna of FIGS. 3A-C achieves a broad impedance bandwidth of 470 MHz in the 2.4-2.5 GHz frequency band. This wide bandwidth feature enables the power harvesting system to operate in a variety of environments and applications. Moreover, the antenna of FIGS. 3A-C achieves a peak realized gain of 4.41 dBi at 2.45 GHz and the measured 3 dB beam width in E-plane and H-plane are 102 degree and 108 degree, respectively.

Antenna Array Structure

Figure 4:
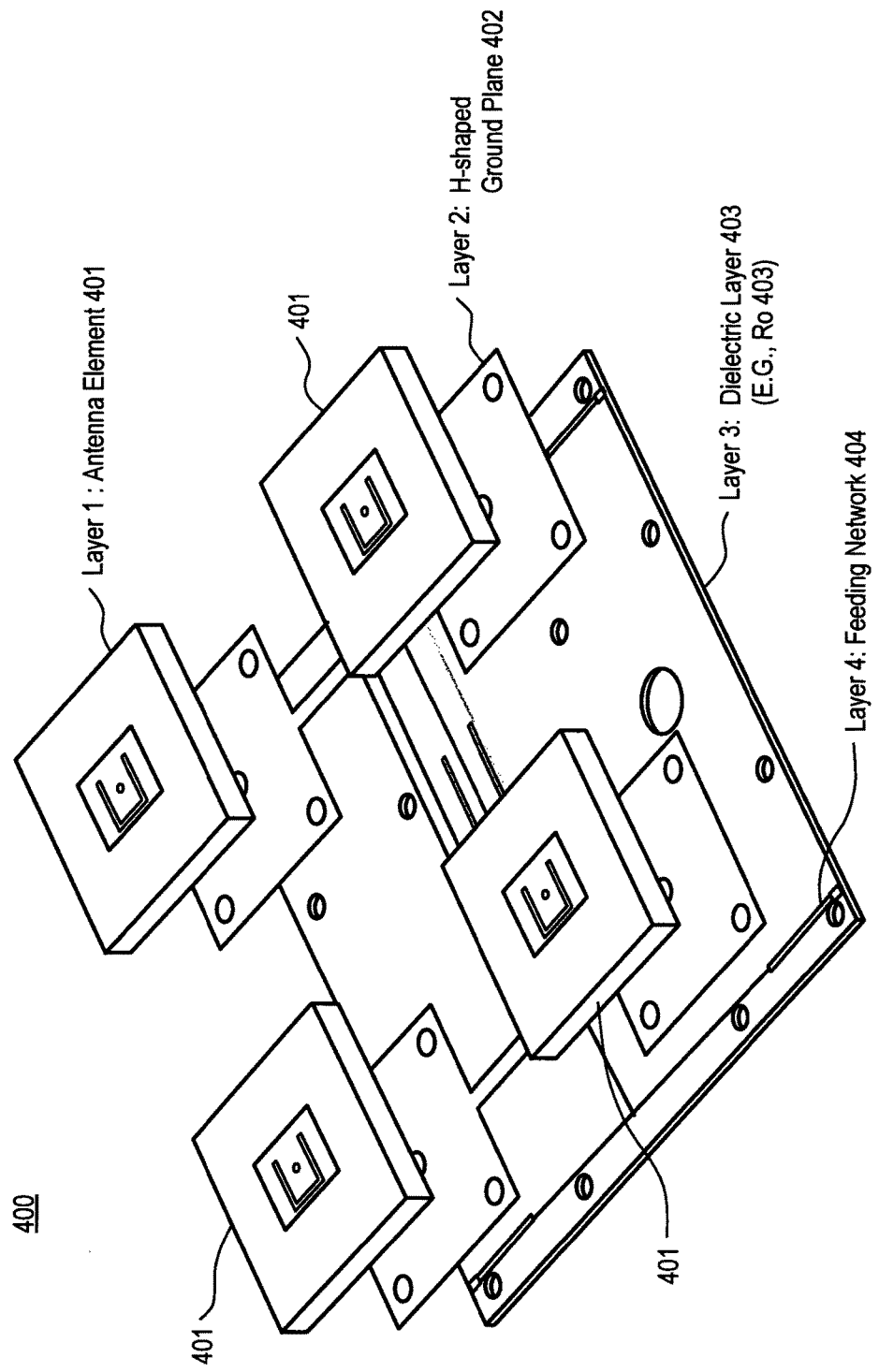
FIG. 4 illustrates one embodiment of a structure of an antenna array.

FIG. 4 illustrates one embodiment of a structure of an antenna array. In contrast to traditional antenna arrays that have the radiating element and feeding network on the same surface and designed intricately together, antenna array 400 comprises four layers. Referring to FIG. 4, the first layer is antenna element 401. One embodiment of antenna element 401 is the antenna element described in FIGS. 3A-3C. In one embodiment, there are four of antenna elements 401 in the array. Each antenna element 401 is placed apart from the other antenna elements in order to reduce the coupling effect and increase the maximum gain.

The second layer is an H shaped ground plane 402. As the antenna element is optimized to function individually, the presence of a large ground plane would affect its performance. In one embodiment, ground plane 402 consists of four square areas that match the size of antenna element 401 and are located directly below each antenna element. These square areas are connected together with an H shaped ground plane region. In one embodiment, in order to exploit the broad bandwidth of antenna element 401, the H shaped ground plane 402 has traces which are a width of 4 mm.

In one embodiment, the ground plane of each individual element forms a pressure contact with the H-shaped microstrip ground on the backplane. In one embodiment, the feeding network is designed as a microstrip transmission line with parallel feeding, with the individual element feeding networks are connected via a through-hole soldering pin. At the center of the array, an SMA connector is soldered to the ground plane, and the conductive pin is fed through to the backside to solder to the feeding network. There is a hole in the array so that the front-mounted SMA cable can be guided toward the back of the array and interconnected to the rest of the harvester without interfering with the individual antenna elements.

The third layer is dielectric layer 403 that is below ground plane 402. In one embodiment, dielectric layer 403 is a 0.76 mm thick RO3730™ material with permittivity 3 is used as the transmission line substrate. The high permittivity allows for a minimally thin planar antenna. Other permittivity materials can be used, but thickness of the substrate would need to be adjusted accordingly.

Figure 10A:
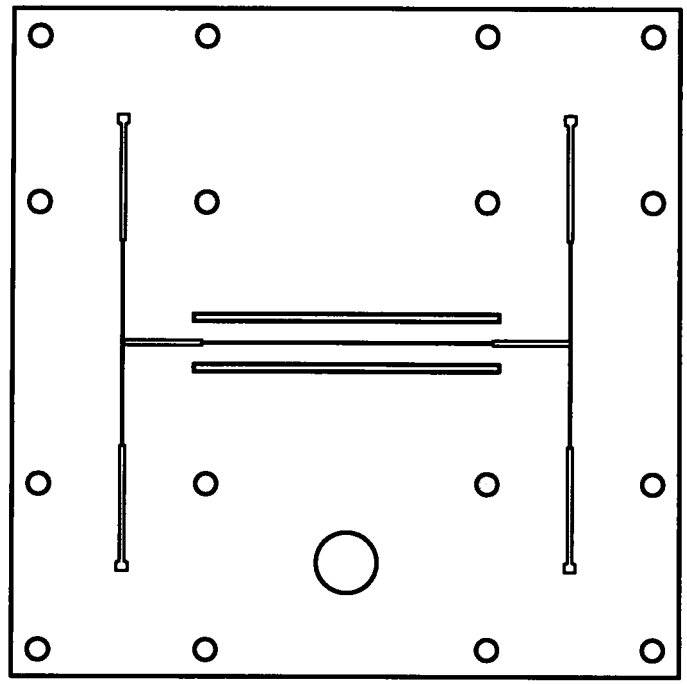
FIG. 10A illustrates one embodiment of a front of an H-shaped ground plane without antenna elements attached.
Figure 10B:
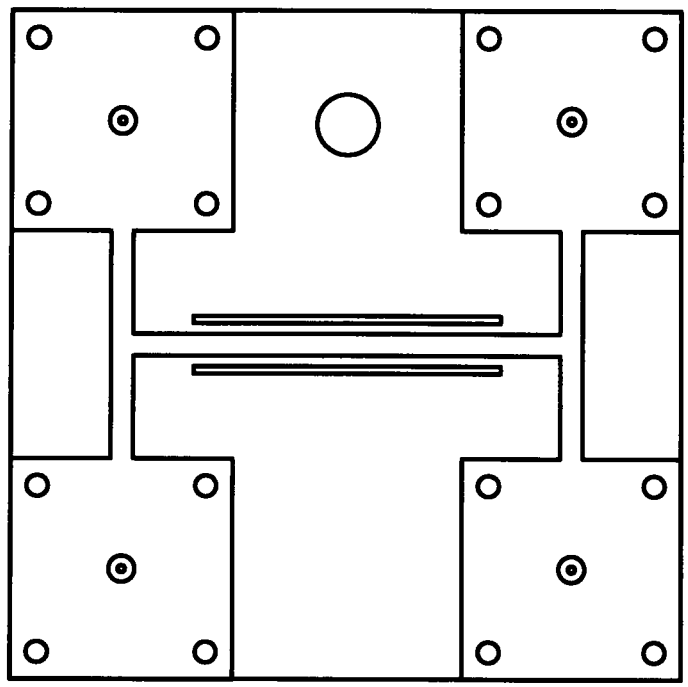
FIG. 10B illustrates one embodiment of the backside parallel feeding network.

The fourth layer is feeding network 404 that is connected to dielectric layer 403. In one embodiment, feeding network 404 is a H-shaped microstrip transmission line which interconnects the radiating elements (feeding networks) of all the individual antenna elements 401. In one embodiment, the feeding network is connected where two elements are in parallel with each other. In this way, the four feed points of the individual elements are interconnected/combined into one overall feedpoint for the array. FIG. 10A illustrates one embodiment of a front of an H-shaped ground plane without antenna elements mounted, and FIG. 10B illustrates one embodiment of the backside of the parallel feeding network. In one embodiment, the feeding network panel shown in FIGS. 10A and 10B is comprised of an H shaped ground plane, a substrate and a microstrip transmission line feeding network. It is well known that an antenna's performance is affected by the conductors in the vicinity; therefore, conventional antenna array design involves optimizing radiating elements corresponding to the size and configuration of the array. In order to have the designed antenna element functioning individually as well as when implemented in the array without modification (as discussed below), an H-shaped ground plane is introduced to reduce the impact of the reflector and provide path for waves traveling inside the substrate.

In one embodiment, the two bottom planes could be a single plane.

In one embodiment, the antenna elements are used in a reconfigurable constructive antenna array. In one embodiment, individual antenna elements 401 could be removed or plugged in to the array because the antenna elements function by themselves, apart from the array. That is, antenna array 400 can operate with one, two, three or four of antenna elements 401, and each antenna element is a fully functioning antenna on its own. In other words, in one embodiment, the antenna element is designed to perform individually as well as when incorporated into the array without any further optimization. The result is an antenna array that supports individual plug and play antenna elements. The feeding network is designed such that there is a frequency and impedance match to the individual elements. The minimal design of the array ground plane and feeding network allow this plug and play capability. This constructive configuration enables end users to customize the antenna topology based on their needs. Also, individual elements can be removed and replaced by other comparably designed elements. Other comparably designed elements could include antennas with broader bandwidth but lower gain (even omnidirectional antennas), antennas tuned to different RF frequencies, individual antenna elements already designed with beam-steering (of fixed or different directions), and circularly or alternately linear-polarized antenna elements.

Figure 7:
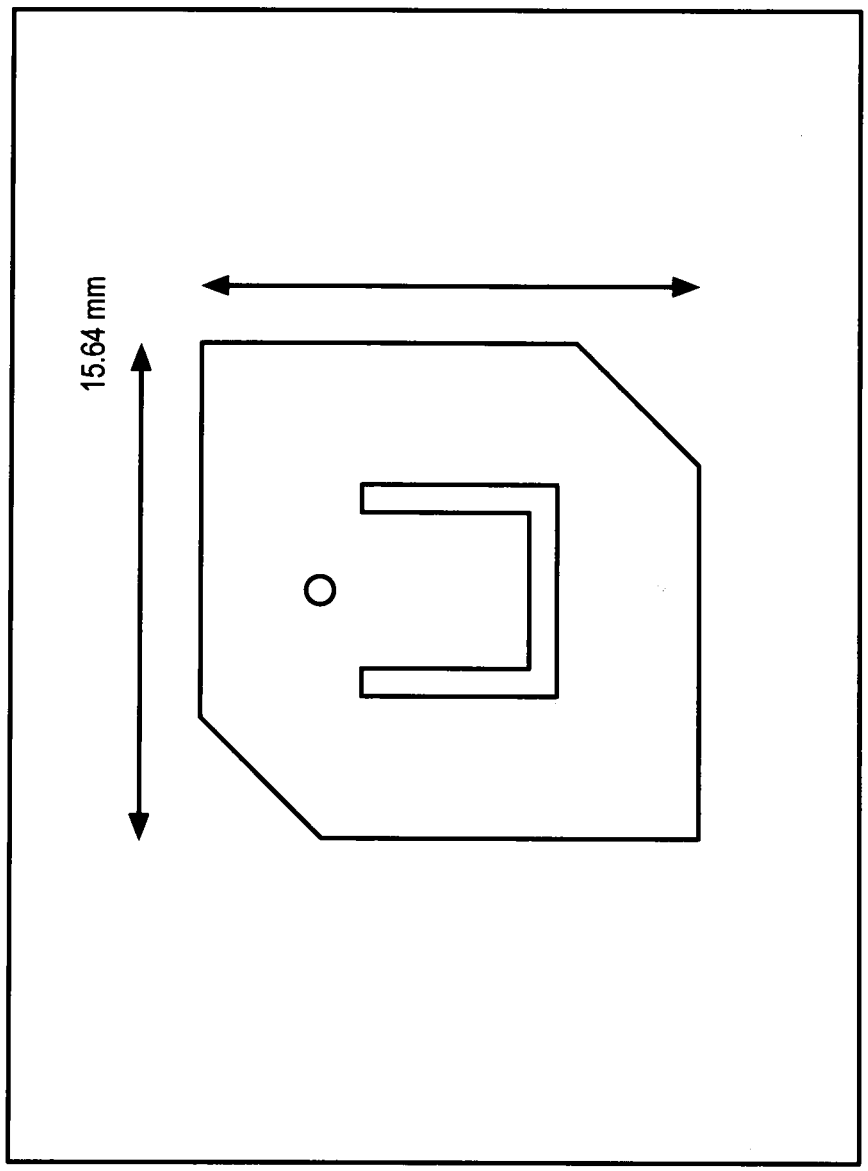
FIGS. 7 and 8 illustrate alternative embodiments of the planar patch antenna with a U-slot.
Figure 8:

FIGS. 7 and 8 illustrate alternative embodiments of the patch antenna shown in FIGS. 3A-C. Referring to FIGS. 7 and 8, the x and y dimensions that make the U-slot wider or narrower are slightly different in the different embodiments. However, each has a difference thickness (in the z direction). For example, the thickness of the antenna in FIG. 8 is 50% the thickness of the antenna in FIGS. 3A-C. Note that the antenna elements in FIG. 8 and FIGS. 3A-C are linearly polarized antennas, but the antenna element in FIG. 7 is circularly polarized.

Figure 11:
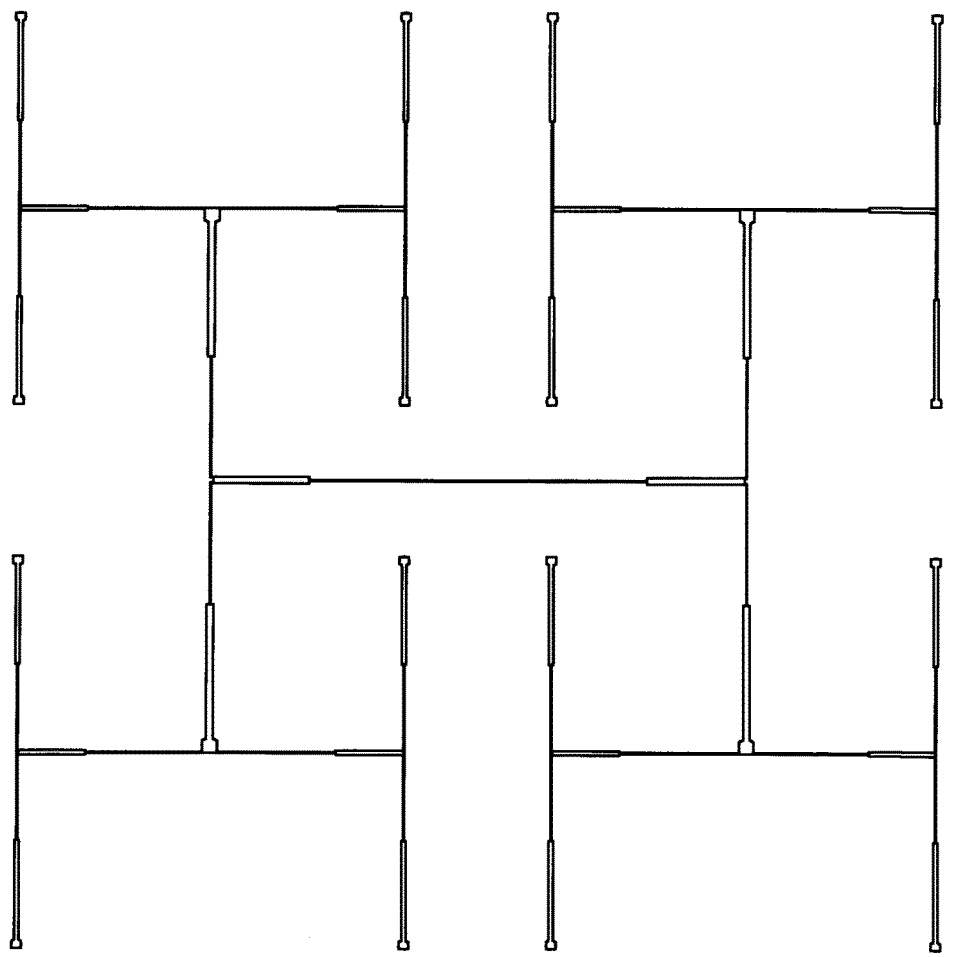
FIGS. 11-13 illustrate examples of layouts and arrays with greater than four elements.
Figure 12:
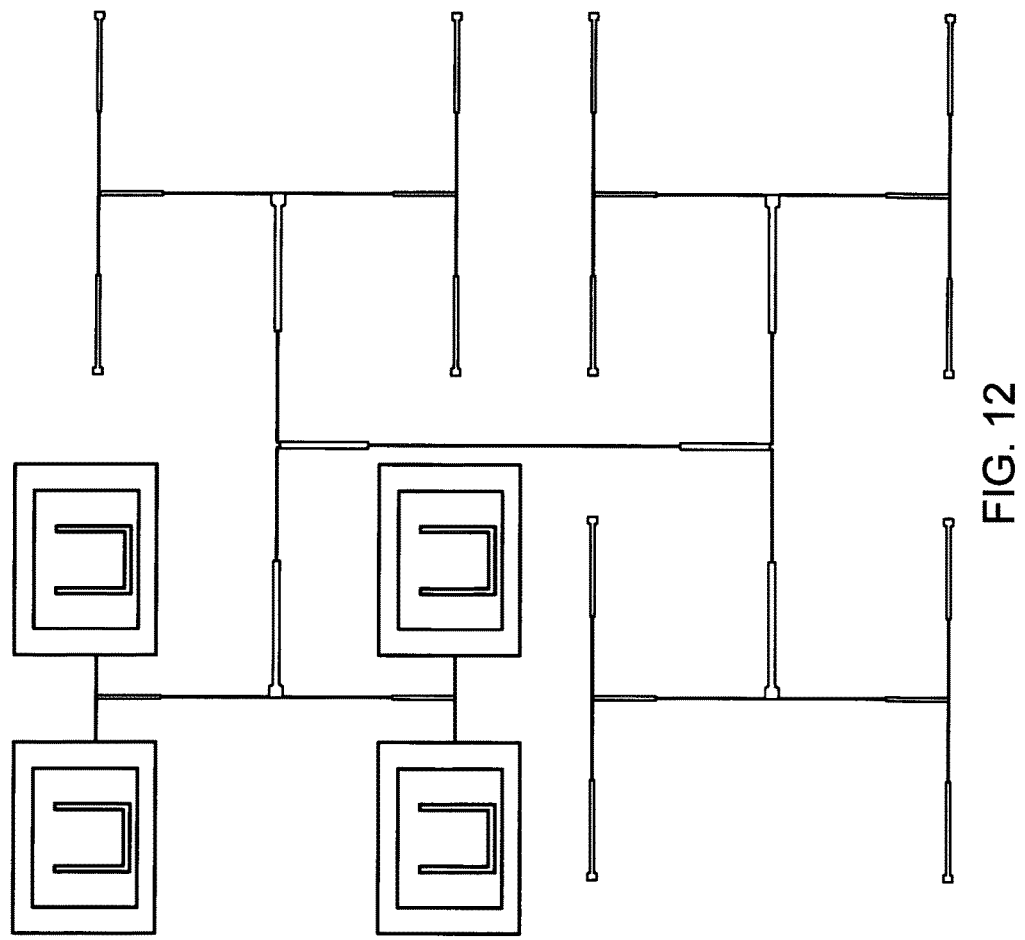
Figure 13:
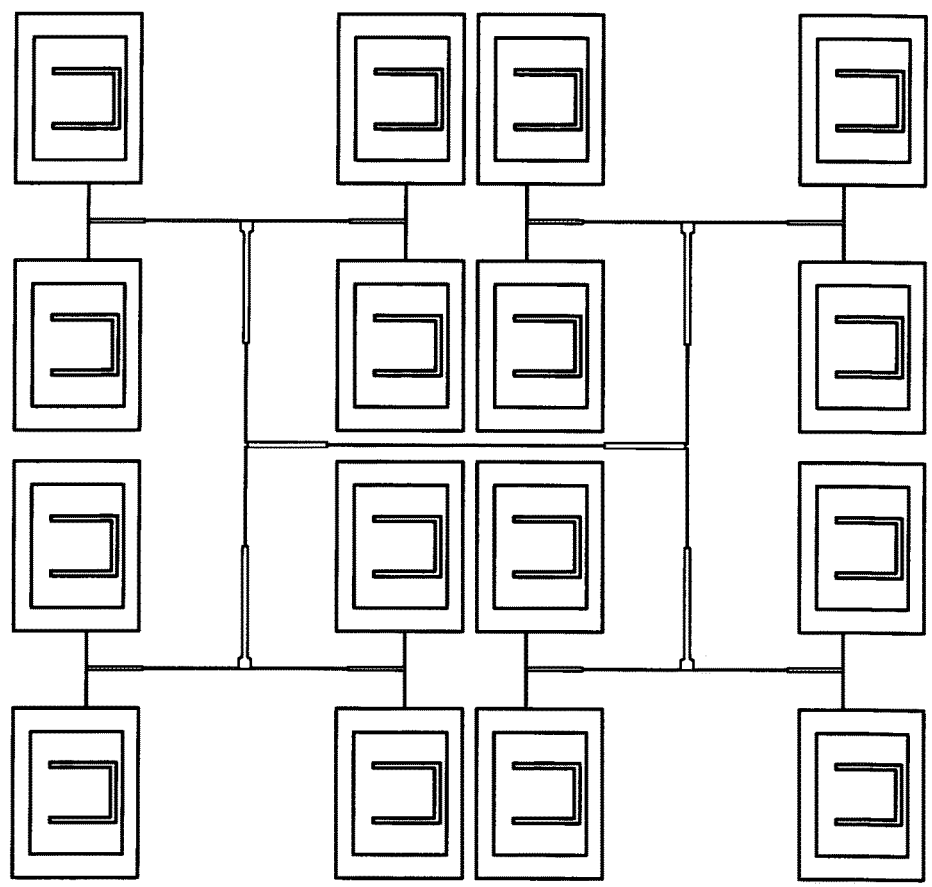

In alternative embodiments, the array is not limited to a 2×2 array and can be expanded to more than four elements. The array can be other dimensions, such as, for example, 3×3, 2×3, 4×4, etc. Thus, the array is scalable in that the technique described herein is applicable to antenna arrays having different numbers of antenna elements. For example, the array may have 8, 9, 16, 32, etc. In one embodiment, the expansion is implemented in part by duplicating the feeding network panel (while using the same antenna element). Even so, it is not necessary that the array be filled with antenna elements. FIGS. 11-13 illustrate examples of layouts and arrays with greater than four elements.

Figure 9:
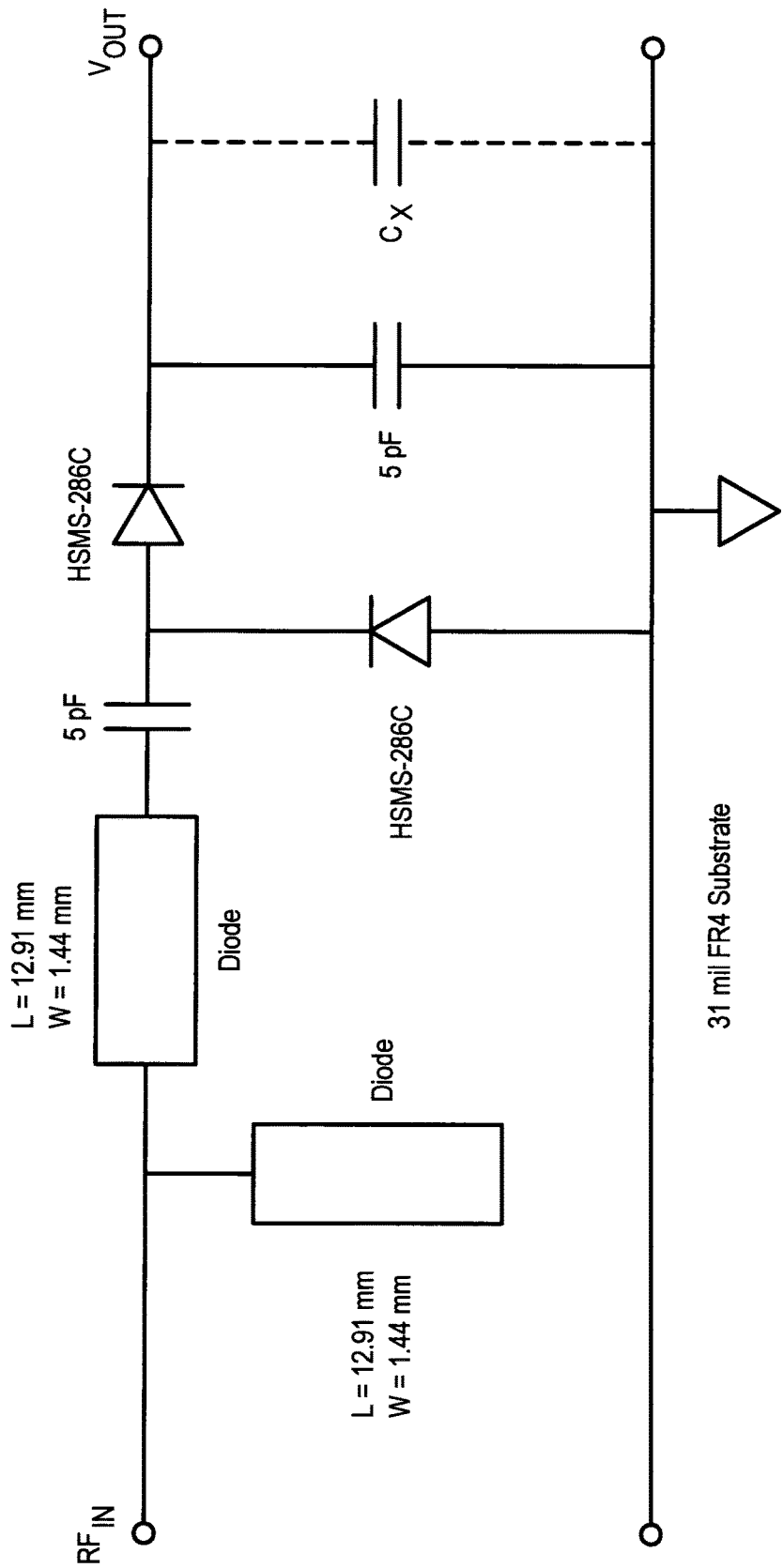
FIG. 9 illustrates one embodiment of a diode-based harvester schematic.

Regardless of the number of antenna elements in the array, the array combines the energy received by the antenna elements in RF (as opposed to DC) and provides it to a single RF rectifier. FIG. 9 illustrates a diode-based harvester schematic. Referring to FIG. 9, in one embodiment, the harvester is designed to be well matched at input power levels below −20 dBm where the majority of ambient Wi-Fi signals are expected to fall. In one embodiment, the harvester is designed to be well matched at input power levels as low as −25 dBm. Thus, the harvester is characterized both in terms of its input match from 2.4 GHz to 2.5 GHz, as well as for harvesting efficiency at its maximum power point (MPP). Harvesting efficiency is defined as the ratio of input RF power at the harvester to harvested DC power at the load ($\eta$=PDC/PRF). The purpose of capacitor $C_x$ in FIG. 9 is to store charge for any subsequent active electronic circuitry. In one embodiment, typical circuit power-up threshold voltages $V_{TH}$ equals 0.8 V. When the individual antenna elements are added to the array network, the resulting array of antenna elements has an overall gain greater than the gain of the individual antenna elements.

In one embodiment, the antenna elements are placed 80 mm apart. In such a case, in one embodiment, the overall antenna array of FIGS. 3A-3C achieves a compact size with the dimension of 120*120*7 mm with a recommended separation of about 40 mm. Note that these dimensions are related to the wavelength of 2.4 GHz (120 mm), and these may change accordingly for different frequencies. In one embodiment, the distance between antenna elements is selected with the consideration of diminishing coupling effect and maximizing gain.

Beam Steering

In one embodiment, the antenna array is a passive phased array that performs beam steering. In one embodiment, the antenna array is a manually beam steered phased array antenna in which the direction of the main lobe is adjustable. The direction of the main lobe is determined by the amount of shift in the feedpoint. In one embodiment, the beam steering is performed by moving the feeding structure along a path. The feedpoint is manually positioned along a marked axis on the array feeding network, such that the phase of the RF energy from the individual antenna elements is shifted with respect to each other, thereby resulting in a steered antenna main lobe. The shifting of the feedpoint does not require any electrical energy, and there are no active current components required by the antenna array to steer the beam.

The movement of the feedpoint may be performed physically or mechanically. In an alternative embodiment, non-mechanical mechanisms may be used to move the feeding point of the antenna.

The beam steering technique described herein is applicable to many types of antenna arrays and is not limited to 2×2 arrays (i.e., the array is scalable in size).

Figures 5A, 5B, 5C:
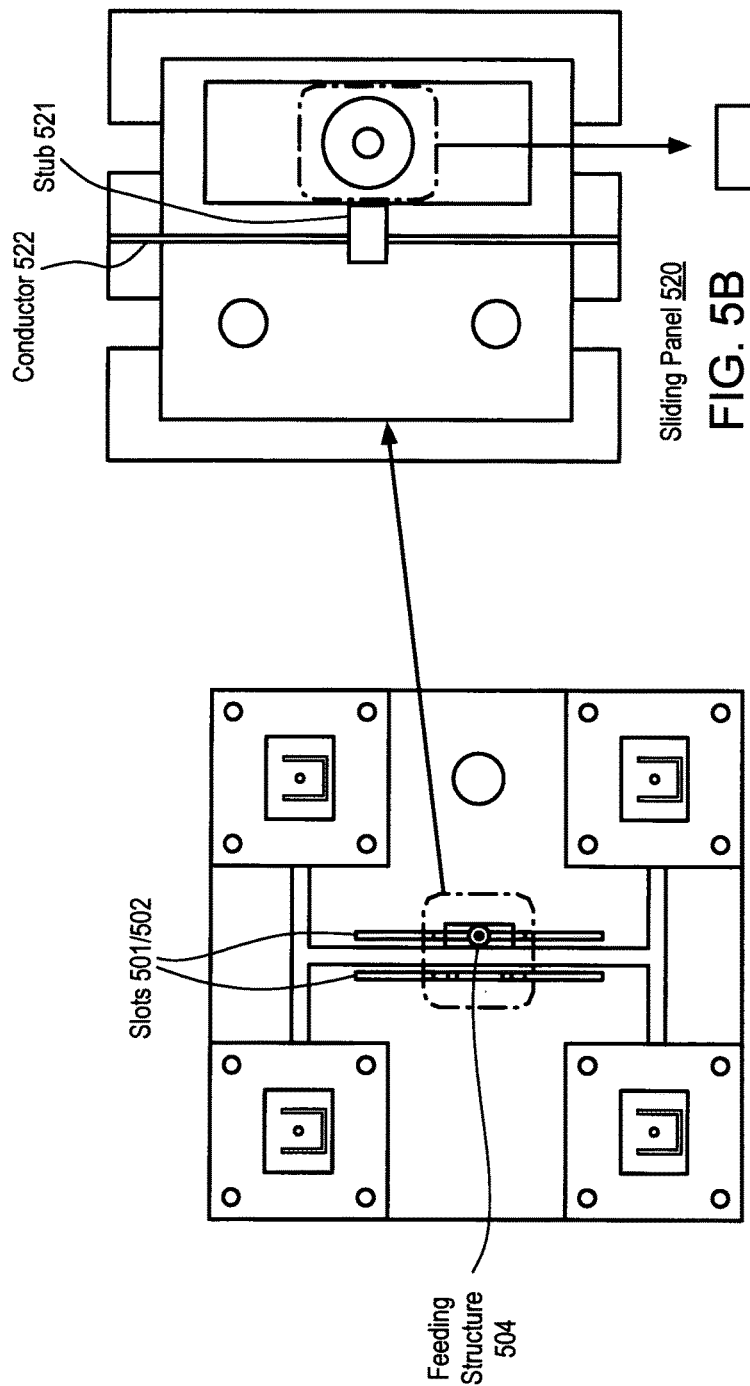
FIGS. 5A-C illustrate one embodiment of an antenna array with a movable feeding structure.

FIGS. 5A-C illustrates embodiments of antenna array with a movable feeding structure. Referring to FIG. 5A, two slots 501 and 502 are in feeding network panel 503. Slots 501 and 502 are tracks for moving feeding structure 504 along the direction (e.g., up or down) for beam steering. In one embodiment, feeding structure 504 comprises two parts: a SMA connector 510 shown in FIG. 5C and a sliding panel 520 shown in FIG. 5B. Feeding network panel 503 is sandwiched between the SMA connector 510 and sliding panel 520. In one embodiment, ground plane 511 of SMA connector 510 has a pressure contact with the H shaped ground plane. In one embodiment, a microstrip feeding stub 521 is printed on sliding panel 520. One end of feeding stub 521 is connected to center conductor 522 of SMA connector 510 and the other end has a pressure contact with the microstrip transmission line of feeding network 503. These two pressure contacts create an electrical connection between conductor 522 and the feeding network.

Note that in one embodiment, the center connector 510 of the SMA is not directly connected to the feed stub. In one embodiment, there is a plated hole drilled through the feed panel. A copper pad is printed on the other side of the feeding panel. The hole connects one end of the feeding stub and the copper pad. The SMA center connector 510 goes through the hole and soldered on the copper pad. In this way, the SMA center connector 510 is effectively connected to the end of the feeding stub, and the feeding panel is pressed onto the antenna panel seamlessly.

Figure 14:
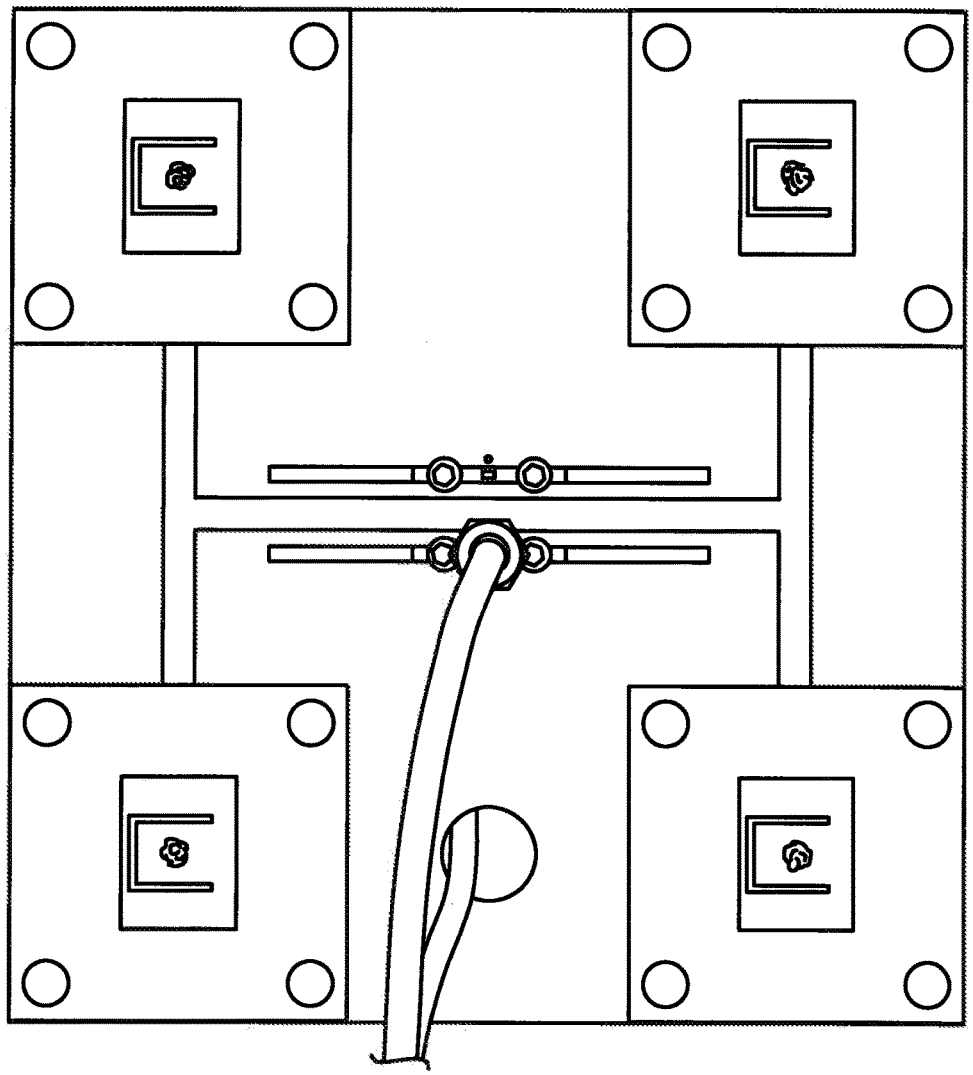
FIGS. 14 and 15 illustrate a top view and bottom view of one embodiment of a connection between a movable feed structure with a sliding panel and a feeding network.
Figure 15:
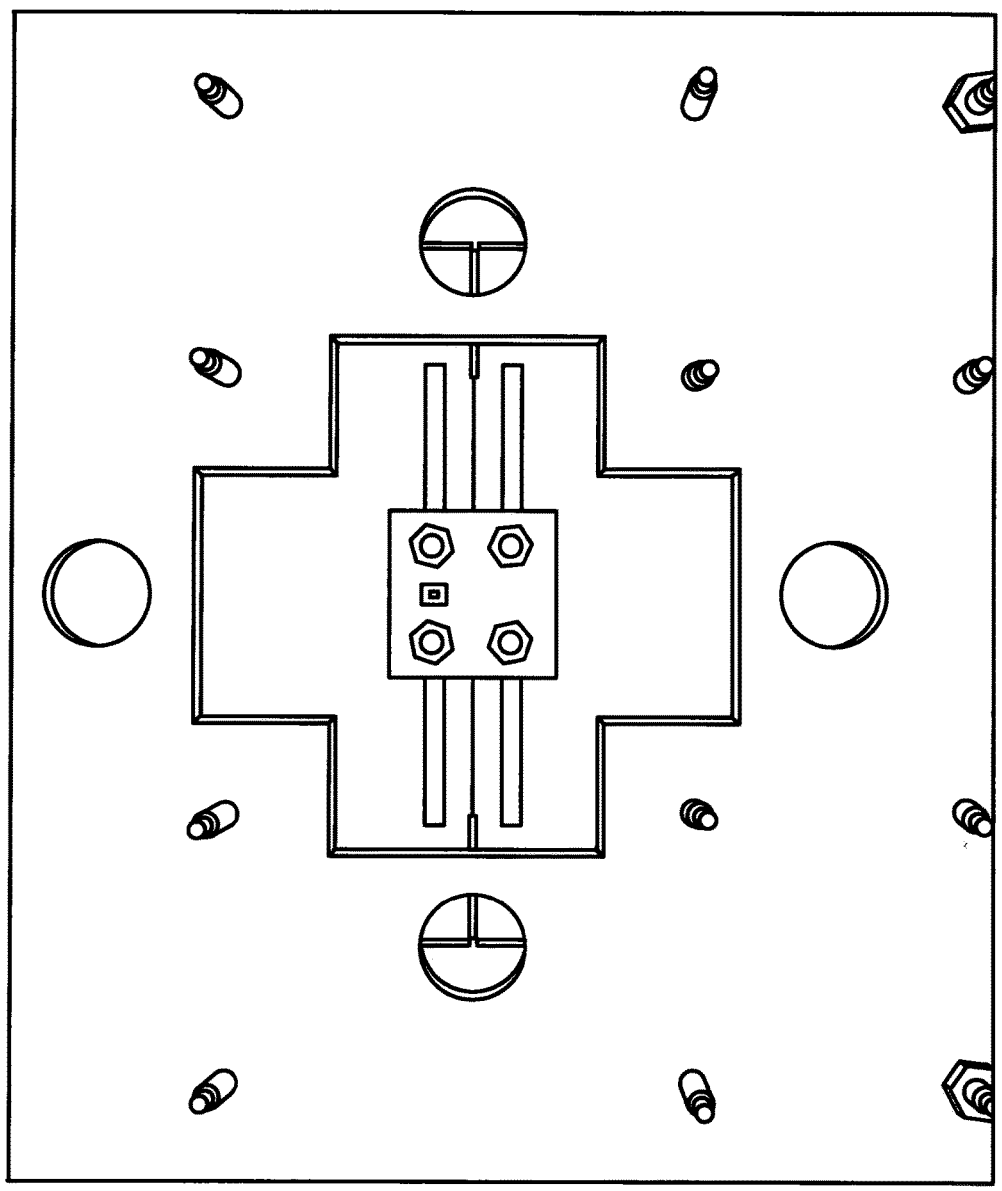

FIGS. 14 and 15 illustrate a top view and bottom view of one embodiment of a connection between a movable feed structure with a sliding panel and a feeding network.

Using the movable feed structure shown in FIGS. 5A-5C, the main beam could be oriented to the desired direction by shifting feeding structure 504 up or down along the path of slots 501 and 502.

The beam steering is achieved by introducing a phase difference between the upper two and lower two antenna elements in the antenna array. The normalized array factor (AF) of a two radiating elements antenna array can be expressed as $$(AF)_n = \cos\left[\frac{1}{2}(k_0 d \cos\theta + \beta)\right] \quad (1)$$

where $k_0$ is the wave number in free space, d is the distance between the antenna elements, and $\beta$ is the phase difference between the antennas.

The concept of a phased array antenna is to control the phase difference between antenna elements for squinting maximum radiation. Using equation (1), one computes the required phase excitation between the elements at a desired direction $$\beta = -kd \cos\theta_0 \quad (2)$$

where $\theta_0$ is the direction of the desired maximum radiation.

Figure 6B:
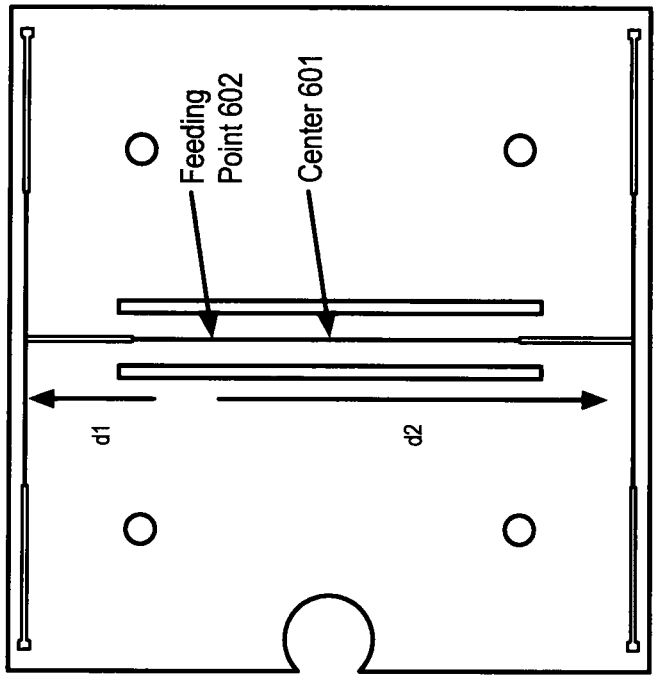
FIGS. 6A-B illustrate one embodiment of a microstrip transmission line feeding network, which is on the bottom of a feeding network panel.
Figure 6A:
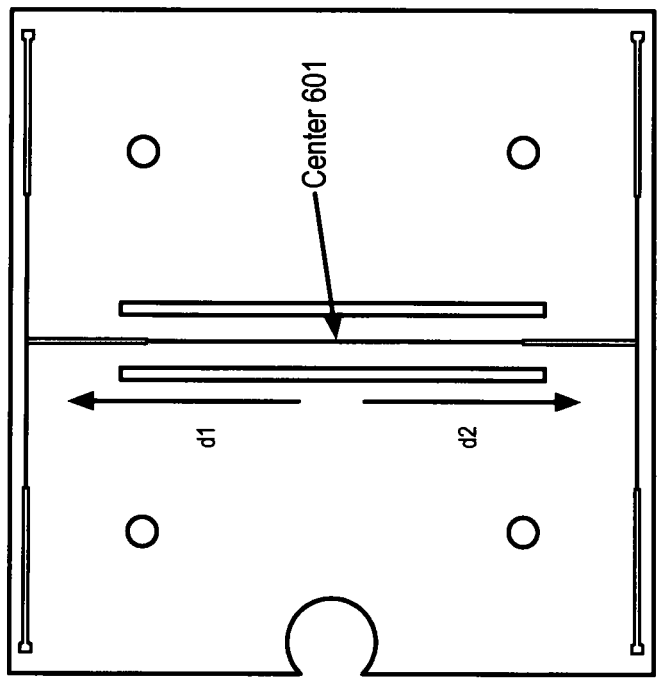

More specifically, the phase difference between the radiating elements is controlled by adjusting the path of the waves traveling inside the microstrip transmission line. FIGS. 6A and B show the microstrip transmission line feeding network, which is on the bottom side of the feeding network panel 503.

When feeding point 602 is at center 601, the waves from the upper and lower two antenna elements travel the same amount of distance in order to reach the feedpoint. In each case, the distance $d_1$ equals $d_2$. Therefore, the phase difference $\beta$=0. The maximum radiation direction of the array factor is at 90 degrees. When feeding point 602 is shifted away from center 601, the waves travel different distances to reach to the feedpoint. For example, in FIG. 6B, the difference between distance $d_1$-$d_2$ equals −2*l, where l is the distance between the feeding point and the center. While this change in wave path has negligible effect on the wave's magnitude, the change introduces a considerable phase difference, which can be computed as $$\beta = k_r \cdot 2l \quad (3)$$

where k is the propagation constant of traveling waves in the transmission line, and $$k = \frac{2\pi f}{v_{rp}} = \omega\sqrt{\varepsilon_e \varepsilon_0 \mu_0} \quad (4)$$

Here $v_p$ and $\in_e$ are the phase velocity and the effective permittivity of the microstrip transmission line, respectively. In one embodiment, for this configuration, $\in_e$=2.34.

The orientation of the maximum radiation of the array factor can be computed as $$\theta_0 = \cos^{-1} -\frac{\beta}{kd} = \cos^{-1} -\frac{2l\sqrt{\varepsilon_e}}{d} \quad (5)$$

Note that the maximum radiation direction has no frequency dependence, and only depends on l, the shifting distance of the feeding point and d, the physical distance between the upper and lower radiating elements. In one embodiment, given that d equals 80 mm, l is in the range of 0 to 20 mm. In one embodiment, defining broadside at 0 degrees, the main beam of the array factor could be oriented in the range of −50 to 50 degrees.

As indicated by Equation 2, the main beam is steered in the same direction for different frequencies. Thus, the beam steering achieved with the antenna array is independent of frequencies.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An antenna apparatus comprising:
an array of antenna elements; and
a single moveable feeding point coupled to the antenna elements, the feeding point movable with respect to the antenna elements in the array and combining radio frequency energy together in RF, wherein movement of the feeding point causes beam steering.

2. The antenna apparatus defined in claim 1 wherein direction of a main lobe is determined by an amount of movement of the moveable feeding point with respect to antenna elements in the array.

3. The antenna apparatus defined in claim 1 wherein the moveable feeding point is manually positioned with respect to antenna elements in the array to cause phase shifting of RF energy from each antenna element in the array with respect to each other.

4. The antenna apparatus defined in claim 1 further comprising:
a feeding network panel electrically connected to the array;
a sliding panel coupled and electrically connected to the feeding network, the sliding panel including the single feeding point and being movable with respect to the array panel to position the feeding point with respect to antenna elements in the array.

5. The antenna apparatus defined in claim 4 wherein the feeding network panel has one or more slots, and further wherein the sliding panel is moved along the one or more slots to position the feeding point.

6. The antenna apparatus defined in claim 5 wherein the one or more slots are aligned with an axis of a feeding network of the array.

7. A sensor node for use in a sensor network, the sensor comprising:
one or more sensors for sensing and logging data;
a transmitter to transmit information wirelessly;
an antenna apparatus comprising
an array of antenna elements, and
a moveable feeding point coupled to the antenna elements to move the feeding point with respect to the antenna elements in the array, the feeding point combining radio frequency energy together for RF;
an energy harvesting unit coupled to the antenna apparatus and operable to convert incident energy received by the antenna apparatus to direct current (DC); and
a microcontroller coupled to the energy harvesting unit, the one or more sensors and the transmitter, the microcontroller operable to cause the transmitter to communicate sensed data from at least one of the one or more sensors while powered by energy previously harvested by the energy harvesting and storage unit.

8. The sensor node defined in claim 7 wherein movement of the feeding point causes RF beam steering.

9. The sensor node defined in claim 8 wherein direction of a main lobe is determined by an amount of movement of the moveable feeding point with respect to antenna elements in the array.

10. The sensor node defined in claim 7 wherein the moveable feeding point is manually positioned with respect to antenna elements in the array to cause phase shifting of RF energy from each antenna element in the array with respect to each other.

11. The sensor node defined in claim 7 further comprising:
a feeding network panel electrically connected to the array;
a sliding panel coupled and electrically connected to the feeding network, the sliding panel including the feeding point and being movable with respect to the feeding network panel to position the feeding point with respect to antenna elements in the array.

12. The sensor node defined in claim 11 wherein the feeding network panel has one or more slots, and further wherein the sliding panel is moved along the one or more slots to position the feeding point.

13. The sensor node defined in claim 12 wherein the one or more slots are aligned with an axis of a feeding network of the array.

14. The sensor node defined in claim 7 further comprising: an energy storage unit operable to store recovered DC power.

15. The sensor node defined in claim 7 further comprising a switch coupled to interface the antenna with the transmitter and the RF energy harvesting and storage unit.

16. A Wi-Fi communication system comprising:
an access point coupled to provide access to a network;
a sensor node comprising
one or more sensors for sensing and logging data;
a transmitter to transmit information wirelessly;
an antenna apparatus comprising
an array of antenna elements, and
a moveable feeding point coupled to the antenna elements to move the feeding point with respect to the antenna elements in the array, the feeding point combining radio frequency energy together for RF;
an energy harvesting unit coupled to the antenna and operable to convert incident energy received by the antenna apparatus to direct current (DC); and
a microcontroller coupled to the energy harvesting unit, the one or more sensors and the transmitter, the microcontroller operable to cause the transmitter to communicate sensed data from at least one of the one or more sensors to the access point while powered by energy previously harvested by the energy harvesting and storage unit.

17. The communication system defined in claim 16 wherein movement of the feeding point causes beam steering with direction of a main lobe is determined by an amount of movement of the moveable feeding point with respect to antenna elements in the array.

18. The communication system defined in claim 16 wherein the moveable feeding point is manually positioned with respect to antenna elements in the array to cause phase shifting of RF energy from each antenna element in the array with respect to each other.

19. The communication system defined in claim 16 further comprising:
   a feeding network panel electrically connected to the array;
a sliding panel coupled and electrically connected to the feeding network, the sliding panel including the feeding point and being movable with respect to the feeding network panel to position the feeding point with respect to antenna elements in the array.

* * * * *